UNITED STATES PATENT OFFICE.

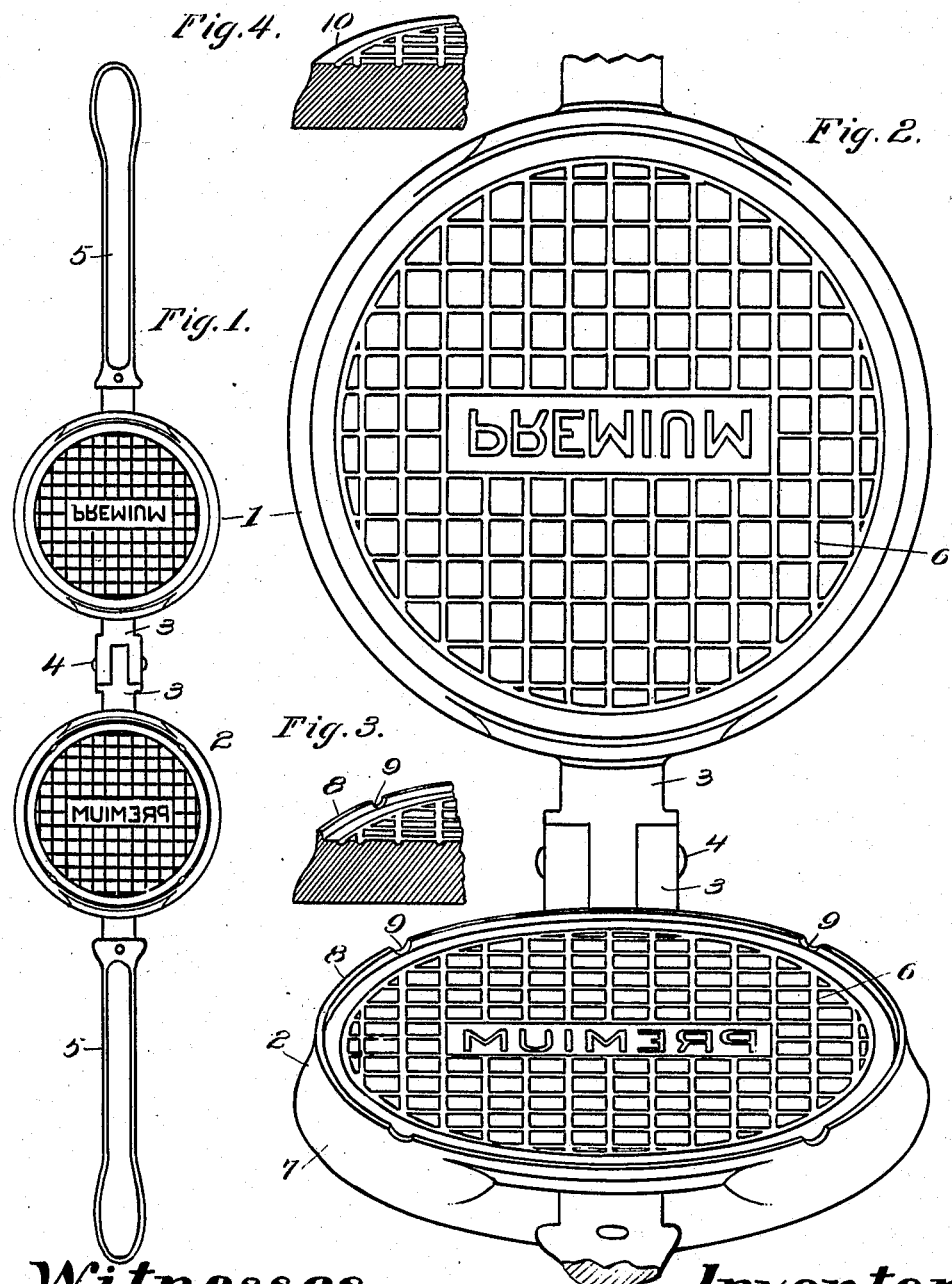

CHARLES E. MENCHES, OF AKRON, OHIO.

BAKING-IRON FOR ICE-CREAM CONES.

No. 924,484.    Specification of Letters Patent.    Patented June 8, 1909.

Application filed March 13, 1909.  Serial No. 483,239.

*To all whom it may concern:*

Be it known that I, CHARLES E. MENCHES, a citizen of the United States, residing at Akron, in the county of Summit and State of Ohio, have invented new and useful Improvements in Baking-Irons for Ice-Cream Cones, of which the following is a specification.

This invention relates to baking irons for ice cream cones, the object of the invention being to provide a baking iron of the class described which will properly confine the batter and form a cake or waffle with a smooth, finished marginal edge, avoiding the usual irregular zig-zag edges now so common, and imparting to the waffle or cake a neat and finished appearance. In the baking irons now employed for this purpose, the baking sections comprise flat surfaces without any rim or vent holes and only two styles of work result. In one kind of work only a small amount of batter is placed between the baking sections insufficient in quantity to run to the edge of the iron thereby producing a ragged or zig-zag edge on the cake or waffle from which the cone is subsequently formed. In order to get the full band or finished marginal edge, it is necessary to employ an extra amount of batter and flood the entire iron, as a result of which the batter runs down and must subsequently be trimmed off with a knife thereby necessitating a great deal of extra time, labor and trouble.

The aim of the present invention is to provide simple means for overcoming the objections above referred to and insuring the formation and baking of a perfect cone forming waffle or cake having a smooth and finished marginal edge.

With the above and other objects in view, the nature of which will more fully appear as the description proceeds, the invention consists in the novel construction, combination and arrangement of parts as herein fully described, illustrated and claimed.

In the accompanying drawings: Figure 1 is a plan view of a baking iron embodying the present invention, showing the same spread out. Fig. 2 is an enlarged front perspective view of the same, illustrating the improvement applied to one of the baking sections. Fig. 3 is a detail broken perspective view of a portion of one of the baking sections to better illustrate the upstanding rim flange and the vents. Fig. 4 is a detail perspective view of a fragment of the complemental baking iron section.

The baking iron comprises the baking sections 1 and 2, the same being provided with shanks 3 which are connected by a hinge joint at the point 4 as clearly shown. The baking sections are provided at their opposite sides with handles 5 which when the baking sections are in meeting contact, lie parallel to each other and one above the other, or they are like an ordinary waffle iron. The sections 1 and 2 may be grooved or ribbed as shown at 6 to impart the required ornamental appearance to a cone forming cake or waffle.

In carrying out the present invention, one of the sections illustrated at 2 is provided with a circumferential enlarged downwardly flaring base 7 which is of considerably greater diameter than the inner baking face of the section, as clearly shown in Figs. 2 and 3 for the purpose of preventing the flame and smoke from attacking the edge of the waffle or cake during the baking process. Extending upward from the marginal edge or rim of the section 2 is an annular flange 8. This flange may be of any desired depth and extends continuously around the rim of the section but is interrupted at intervals by vent openings or notches 9 which extend downward toward the baking face of the section and are designed to allow for the escape of excess batter.

In the baking process, a sufficient quantity of batter is placed on the section 2 to flood the same out to the flange 8 and when the two sections are brought together, the excess batter is forced outward through the vents 9, the flange 8 serving as a cut off and confining wall for the extreme marginal edge of the cake or waffle, resulting in there being imparted to the waffle a smooth and finished outer marginal edge. The other section 1 of the baking irons is provided with a flat smooth marginal surface or rim as shown at 10 against which the edge of the flange 8 rests when the two sections of the irons are brought together. The vents 9 which are preferably in the form of semi-circular notches as shown, provide the necessary openings around the marginal meeting edges of the two sections to allow for the outflow of surplus batter. Upon the completion of the baking process, the small projecting points formed by baking the batter in the vents 9 are easily broken off and the effect on the complete waffle is not noticeable.

The baking iron hereinabove described holds the batter in place between the sections and prevents the flooding of the batter or the running of the same over the edges of the baking section, doing away with all extra labor, trouble and cost of having to trim the edges of the cone forming cake or waffle.

I claim:—

Baking irons for ice cream cones comprising baking sections hinged together and provided with handles, said sections being circular in form and one of said sections being provided on its baking face with an upstanding rim flange serving as a stop for the batter, said flange being provided at intervals with vents for the batter, substantially as described.

In testimony whereof I affix my signature in presence of two witnesses.

CHARLES E. MENCHES.

Witnesses:
 CLARENCE W. MAY,
 ELMER E. ACKER.